United States Patent [19]
Lewchuk

[11] Patent Number: 6,157,993
[45] Date of Patent: *Dec. 5, 2000

[54] PREFETCHING DATA USING PROFILE OF CACHE MISSES FROM EARLIER CODE EXECUTIONS

[75] Inventor: W. Kurt Lewchuk, Austin, Tex.

[73] Assignee: Advanced Micro Devices, Inc., Sunnyvale, Minn.

[ * ] Notice: This patent is subject to a terminal disclaimer.

[21] Appl. No.: 09/476,938

[22] Filed: Jan. 3, 2000

Related U.S. Application Data

[63] Continuation of application No. 08/950,337, Oct. 14, 1997, Pat. No. 6,047,363.

[51] Int. Cl.[7] ...................................................... G06F 12/08
[52] U.S. Cl. ........................ 711/213; 711/137; 364/263.1
[58] Field of Search .................................... 711/118, 137, 711/204, 213; 712/207; 364/263.1

[56] References Cited

U.S. PATENT DOCUMENTS

| | | |
|---|---|---|
| 5,093,777 | 3/1992 | Ryan . |
| 5,367,656 | 11/1994 | Ryan . |
| 5,418,922 | 5/1995 | Liu . |
| 5,450,561 | 9/1995 | Ryan . |
| 5,495,591 | 2/1996 | Ryan . |
| 5,537,573 | 7/1996 | Ware et al. . |
| 5,544,342 | 8/1996 | Dean . |
| 5,761,468 | 6/1998 | Emberson . |
| 5,761,706 | 6/1998 | Kessler et al. . |
| 6,003,115 | 12/1999 | Spear et al. .............................. 711/137 |

OTHER PUBLICATIONS

Chen, Tien–Fu and Jean–Loup Baer. "Effective Hardware–Based Data Prefetching for High–Performance Processors," IEEE Transactions on Computers, vol. 44, No. 5, May 1995, pp. 609–623.

Farkas, Keith I., Norman P. Jouppi, and Paul Chow, "How Useful Are Non–Blocking Loads, Stream Buffers and Speculative Execution in Multiple Issue Processors?," High–Performance Computer Architecture Symposium, pp. 78–89. 1995.

Primary Examiner—Eddie P. Chan
Assistant Examiner—Kevin Verbrugge
Attorney, Agent, or Firm—Conley, Rose & Tayon, P.C.; Lawrence J. Merkel

[57] ABSTRACT

During execution of a code sequence, a profile is generated containing addresses of the data cache misses experienced during the execution. The profile is associated with the code sequence such that, during a future execution of the code sequence, the profile is available. Prefetching may be performed, based on the profile. Since the profile records a sequence of miss addresses, an arbitrarily complex miss pattern can be prefetched. In one embodiment, multiple profiles may be associated with a code sequence having multiple entry points (e.g. multiple instructions at which execution may begin within the code sequence). When the code sequence is executed, the profile associated with the entry point of the current execution may be selected. Additionally, a new profile may be generated. If the entry point of the current execution is not associated with a profile, the new profile is saved. If the entry point of the current execution is associated with a profile, the new profile is saved if the current profile is found to be ineffective.

19 Claims, 8 Drawing Sheets

| Code Linear Address 122 | Size 124 | Effectiveness 126 |
|---|---|---|
| Miss Address 1 128A | Miss Address 2 128B | |
| Miss Address 3 128C | Miss Address 4 128D | |
| ... | | |

Profile on Disk 120

PREFETCHING DATA USING PROFILE OF CACHE MISSES FROM EARLIER CODE EXECUTIONS

This application is a continuation of U.S. patent application Ser. No. 08/950,337, filed Oct. 14, 1997 now U.S. Pat. No. 6,047,363.

BACKGROUND OF THE INVENTION

1. Field of the Invention

This invention is related to microprocessors and computer systems and, more particularly, to prefetching within computer systems.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand high memory bandwidth due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to allow high bandwidth memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

High memory bandwidth may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby increasing the available bandwidth. Cache misses require the access to receive data from the main memory, thereby lowering the available bandwidth.

In order to increase cache hit rates, computer systems may employ prefetching to "guess" which data will be requested by the microprocessor in the future. The term prefetch, as used herein, refers to transferring data (e.g. a cache line) into a cache prior to a request for the data being received by the cache. A "cache line" is a contiguous block of data which is the smallest unit for which a cache allocates and deallocates storage. If the prefetched data is later accessed by the microprocessor, then the cache hit rate may be increased due to transferring the prefetched data into the cache before the data is requested.

Unfortunately, prefetch algorithms employed by microprocessors are generally very simple algorithms which observe the pattern of memory accesses during execution of a program and attempt to prefetch addresses during that execution based on the observed pattern. For example, stride-based prefetch algorithms have been employed in which the difference between consecutive memory accesses (the "stride") is calculated and used to generate prefetch addresses. These simple prefetch algorithms may not handle a large portion of the memory access patterns which may be exhibited by programs. Generally, only memory access patterns having a highly regular pattern which can be characterized by one or a small number of values (e.g. strides) are prefetched accurately, and other patterns exhibit varying degrees of prefetch inaccuracy. Inaccurate prefetching consumes memory bandwidth which may be needed by the other memory operations, and may increase cache miss rates by dislodging data from the cache which may later be accessed in response to the program. A prefetch mechanism which can handle arbitrarily complex memory access patterns (wherein a memory access pattern is a sequence of memory accesses) and exhibit a higher degree of prefetch accuracy is therefore desired.

SUMMARY OF THE INVENTION

The problems outlined above are in large part solved by a profiling prefetch method in accordance with the present invention. During execution of a code sequence, a profile is generated containing addresses of the data cache misses experienced during the execution. The profile is associated with the code sequence such that, during a future execution of the code sequence, the profile is available. Prefetching based on the profile may advantageously increase the data cache hit rate (or the hit rate in a prefetch cache, if provided). Since the profile records a sequence of miss addresses, an arbitrarily complex miss pattern can be accurately prefetched. Prefetch accuracy may thereby be increased, even in cases in which a complex pattern of addresses is encountered. The increased prefetch accuracy may lead to increased performance during execution of the program.

In one embodiment, multiple profiles may be associated with a code sequence having multiple entry points (e.g. multiple instructions at which execution may begin within the code sequence). When the code sequence is executed, the profile associated with the entry point of the current execution may be selected. Additionally, a new profile may be generated. If the entry point of the current execution is not associated with a profile, the new profile is saved. If the entry point of the current execution is associated with a profile, the new profile is saved if the current profile is found to be ineffective.

Broadly speaking, the present invention contemplates a method for prefetching data accessed by a code sequence in a computer system. A profile comprising addresses corresponding to up to N cache misses experienced during a first execution of the code sequence is generated. The addresses within the profile are prefetched during a second execution of the code sequence.

The present invention further contemplates a profile unit for a microprocessor, comprising a miss buffer and a control unit. The miss buffer is configured to store up to M miss addresses provided by a data cache. Coupled to receive a miss indication from the data cache indicating that the data cache is experiencing a cache miss, the control unit is further coupled to the miss buffer and is configured to cause the miss buffer to store a miss address provided by the data cache upon receiving the miss indication. Additionally, the control unit is configured to initiate a transfer of the M miss addresses from the miss buffer to a predetermined memory location upon accumulating the M miss addresses within the miss buffer.

Moreover, the present invention contemplates a microprocessor comprising a data cache and a profile unit. The data cache is configured to store data operated upon by the microprocessor in response to a code sequence. Coupled to the data cache, the profile unit is configured to generate a profile of miss addresses corresponding to data cache misses experienced during execution of the code sequence. Still further, the profile unit is configured to store the profile to a memory.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
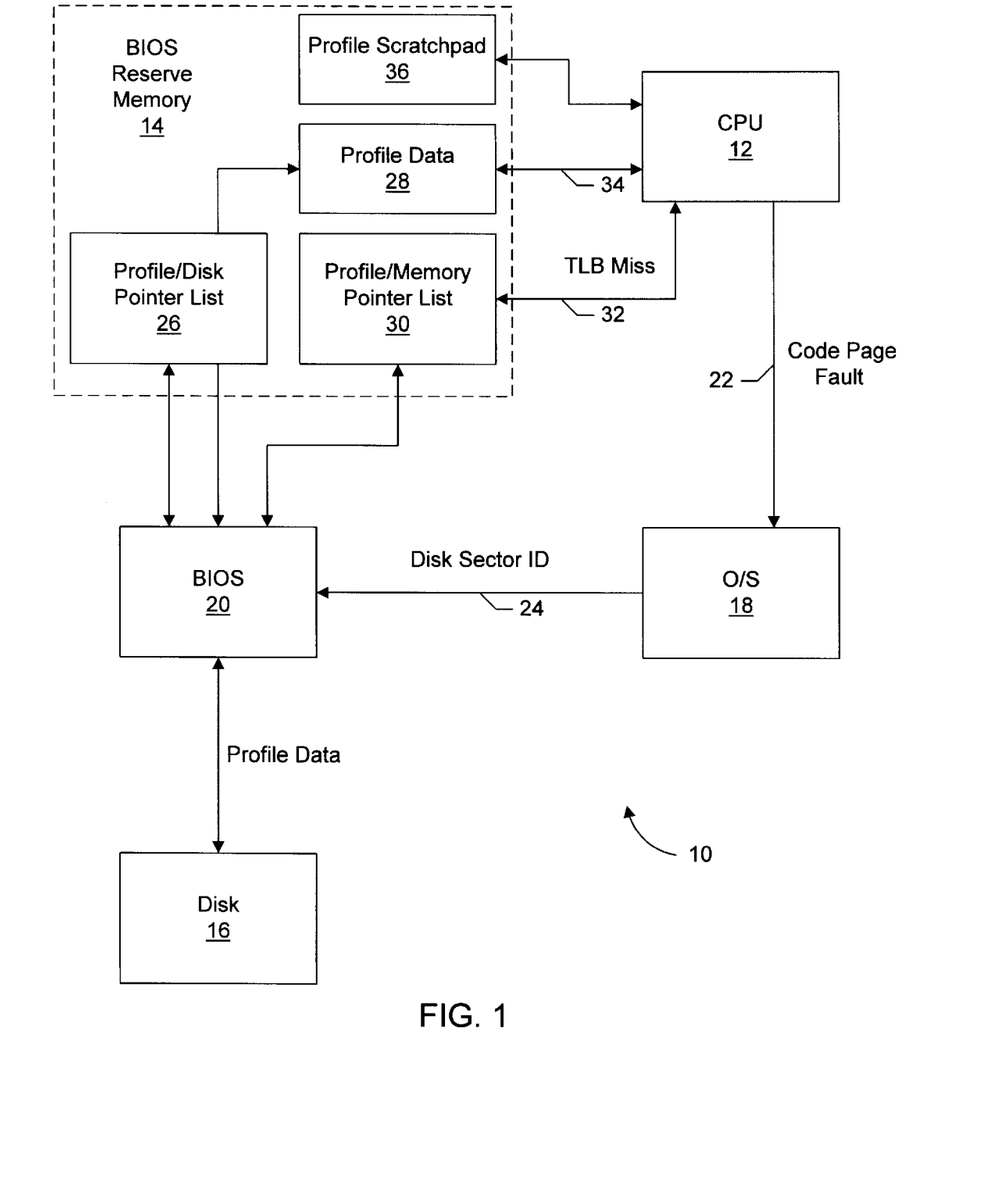
FIG. 1 is a high-level block diagram of one embodiment of a computer system including hardware and software components.

Turning now to FIG. 1, a block diagram of one embodiment of a computer system 10 is shown. Both software and hardware components of computer system 10 are shown to illustrate interactions of the components when employing a prefetch mechanism. Hardware components include a central processing unit (CPU) 12, a memory 14, and a disk 16. Software components include an operating system (O/S) 18 and a basic input/output system (BIOS) 20. It is noted that other configurations of computer system 10 are possible and contemplated. It is further noted that computer system 10 may include additional hardware and software components as desired.

Generally speaking, computer system 10 is configured to generate a profile corresponding to a code sequence being executed. The profile is stored on disk 16 and is used during subsequent executions of the code sequence to direct prefetching by CPU 12. The profile includes a list of addresses which miss a data cache within CPU 12 during an execution of the code sequence. If the code sequence, during a subsequent execution, generates the same set of addresses as were generated in the execution which created the profile, then prefetching the list of addresses in the profile may prove beneficial to performance by reducing the number of data cache misses experienced during the subsequent execution. Performance of computer system 10 may thereby be increased.

Even if the subsequent execution of the code sequence does not match the profile exactly, performance increases may be realized as long as the benefits of prefetching (e.g. increased cache hit rates during execution of the code sequence) outweigh any disadvantages (e.g. dislodging cache lines which are later accessed in favor of prefetched cache lines which are not accessed, and consumption of bandwidth between the CPU and the memory system). CPU 12, in addition to prefetching based upon a profile, may be configured to determine if the profile successfully predicts the addresses generating during the current execution. A profile which is no longer successful may be replaced with a newly generated profile, or may be deactivated such that subsequent executions of the code sequence do not use the profile.

As used herein, a code sequence is a set of instructions which are moved from disk 16 to memory as a group. For example, a code sequence may be a page of instructions. The page of instructions may be read from disk 16 to fill a page in memory when a program attempts to fetch an instruction within the page of instructions. The instruction being fetched may not be the first instruction in the page. The address of the initial instruction to be fetched within a code sequence (either when the code sequence is originally transferred into memory or when an instruction outside the code sequence causes a transfer into the code sequence) is referred to as the "entry point" within the code sequence.

In one embodiment, the addresses within the profile are linear addresses (i.e. addresses which have not been translated to a physical address in memory). Physical addresses associated with a set of linear addresses are likely to be different from execution to execution, while linear addresses have some likelihood of remaining the same. For example, statically allocated memory for variables used in a code sequence may tend to have a same linear address each time the code sequence is executed. The physical address is dependent upon which physical memory pages are available when the code sequence is initiated. Depending upon the address translation structure employed by CPU 12, linear addresses may also be referred to as virtual addresses or effective addresses. The translation of the linear address to a physical address may be performed using a paging translation scheme in which a page of memory is allocated upon request of a byte within the page. A page may be of any suitable size. For example, a page size of four kilobytes may be used. If a linear address is generated and a corresponding physical address is not defined within the paging translation scheme, then a "page fault" is signalled to O/S 18. O/S 18 may allocate a page for the linear address and fill the page from disk (or zero the page, if no fill data is available for the page).

Communication between blocks in FIG. 1 to accomplish profiling and use of the profiles is illustrated in FIG. 1 according to one embodiment of profiling. Upon entering a code sequence for the first time, CPU 12 encounters a page fault for the code sequence (illustrated by arrow 22). CPU 12 signals O/S 18 that a code page fault has been detected (e.g. by taking an exception). O/S 18 allocates a page of memory to store the code sequence, generating a translation from the linear address of the code sequence to the allocated physical page and storing the translation information in a page translation table as defined by the paging translation structure supported by CPU 12. Additionally, O/S 18 fills the page with the code sequence (transferred from disk 16).

O/S 18 is further configured to access a BIOS routine within BIOS 20 upon allocating a code page. O/S 18 provides BIOS 20 with the disk sector ID of the code sequence (illustrated at arrow 24). A disk sector ID is a number which uniquely identifies a storage area upon disk 16. A disk sector may be of any suitable size. If a disk sector is smaller than a page, than the first disk sector associated with a code sequence is used.

BIOS 20 hashes the disk sector ID provided by O/S 18 with a base address of a profile/disk pointer list 26 to select an entry within profile/disk pointer list 26. Hashing is used to reduce the size of the list by operating upon the disk sector ID in some fashion (usually an exclusive OR function). Profile/disk pointer list 26 provides a disk sector ID at which a profile corresponding to the code sequence is stored. Profile/disk pointer list 26 is stored on disk 16 as well, and is loaded into memory 14 upon power up of computer system 10 for access by BIOS 20.

Using the disk sector ID provided from profile/disk pointer list 26, BIOS 20 reads one or more profiles associated with the code sequence from disk 16 and stores the profiles into a profile data area 28 within memory 14. Additionally, BIOS 20 creates an entry within a profile/memory pointer list 30 for each profile. Profile/memory pointer list 30 provides an address within profile data area 28 at which a profile is stored. A hash function involving the code linear address and the base address of profile/memory pointer list 30 may be used to locate an entry within profile/memory pointer list 30. It is noted that both CPU 12 and BIOS 20 employ the hash function for accessing profile/memory pointer list 30. BIOS 20 generates entries in list 30 using the hash function, and CPU 12 reads entries in list 30 using the hash function. The profiles read from disk 16 include the code linear address of the corresponding code sequence, and BIOS 20 may use the code linear address provided in the profile to generate the corresponding entry within profile/memory pointer list 30.

In the present embodiment, more than one profile may be associated with a code sequence if the code sequence is initiated at multiple entry points. Each entry point may have a different profile. Therefore, the hash function which locates an entry within profile/memory pointer list 30 includes the entry point portion of the code linear address.

CPU 12 reads a profile from profile data area 28 (via profile/memory pointer list 30) upon detecting a translation lookaside buffer (TLB) miss when fetching a code sequence (illustrated by arrows 32 and 34). A TLB miss is used as the event triggering a profile read for several reasons. First, a code sequence may be entered multiple times while the code sequence resides in memory, and therefore a page fault may be less likely to occur than a miss in the TLB during subsequent executions of the code sequence. Additionally, if computer system 10 is a multiprocessor system, then each CPU in the system may benefit from the profile because each CPU will experience a TLB miss when fetching the code sequence for the first time.

CPU 12 is further configured to generate a new profile while executing a particular code sequence. The new profiles may be stored in a profile scratchpad 36 within memory 14. O/S 18 and BIOS 20 may determine whether or not to replace an existing profile with the new profile based upon the effectiveness of the existing profile. If no existing profile is stored for the entry point in the code sequence which is fetched by CPU 12, then the new profile is saved. To save a profile, the profile may be stored to disk 16, inserted into profile data area 28, and pointers added to profile/memory list 30 and profile/disk pointer list 26. O/S 18 and BIOS 20 may determine the effectiveness of the existing profile and/or create the new profile upon evicting the code page storing the corresponding code sequence from memory (e.g. to allocate the physical page in memory to another code or data page).

It is noted that the division of profile functionality between O/S 18, BIOS 20, and CPU 12 described above is one of many possible divisions. Any division of functionality between the various components of computer system 10 may be used.

Memory 14 is memory reserved for use by BIOS 20 and CPU 12 for profiling purposes. Memory 14 may be a portion of a main memory within computer system 10 (not shown). The main memory is used to store code and data to be operated upon by CPU 12. The portion reserved as memory 14 is allocated by O/S 18. Alternatively, memory 14 may be a separate memory from the main memory.

Figure 2:
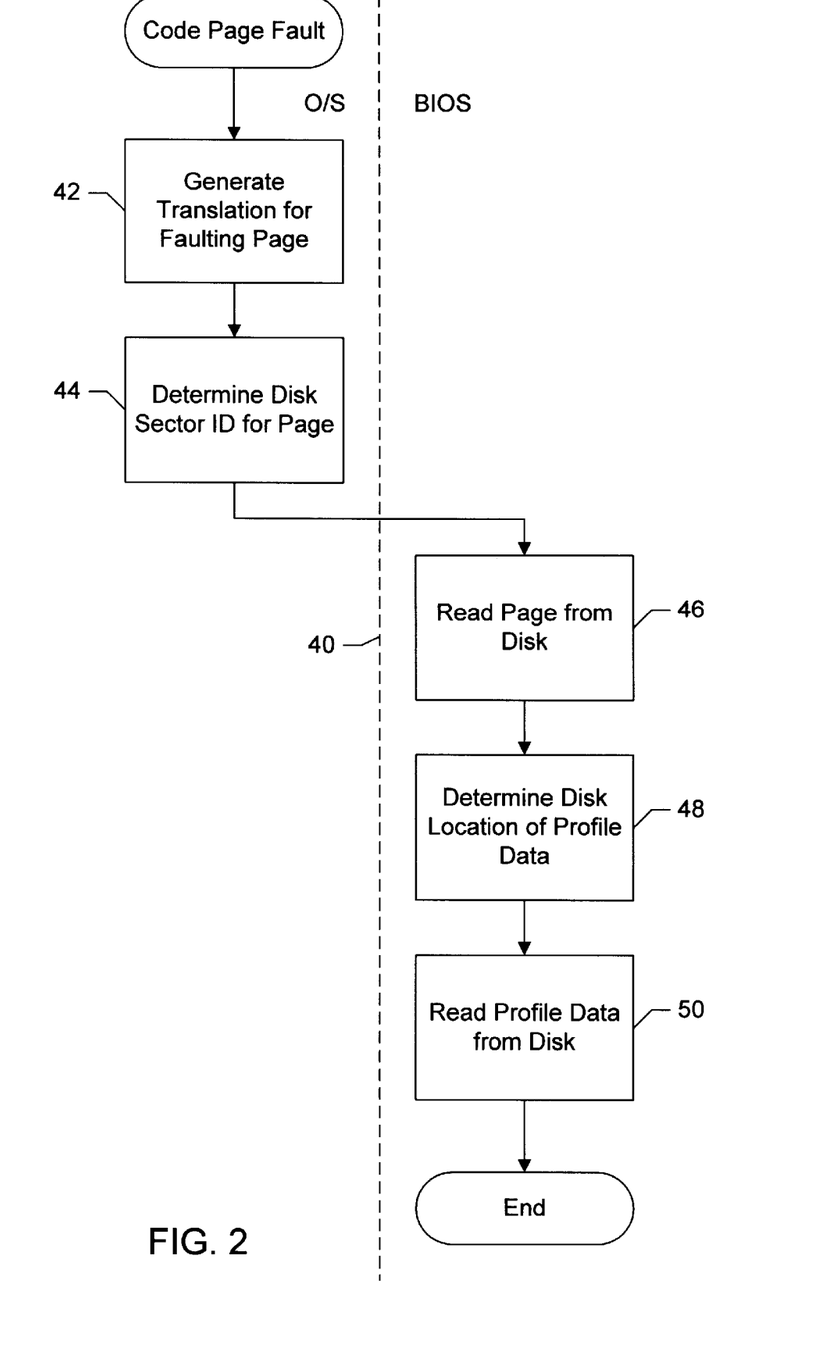
FIG. 2 is a flowchart illustrating operation of one embodiment of the computer system shown in FIG. 1 upon experiencing a page fault for a code page.

Turning now to FIG. 2, a flowchart illustrating operation of one embodiment of computer system 10 during a page fault for a code page is shown. A vertical dashed line 40 is shown in FIG. 2 to indicate which steps are performed by O/S 18 (steps to the left of line 40) and which are performed by BIOS 20 (steps to the right of line 40) according to one embodiment of computer system 10. Other embodiments may employ different steps and/or divide the steps between O/S 18 and BIOS 20 differently.

O/S 18, upon receiving a page fault exception for a code page, allocates a physical page to store the requested code sequence. A page fault is signalled after not only a TLB miss by the address of-the code sequence, but also after CPU 12 searches the software-managed page translation tables (stored in memory). O/S 18 generates a translation for the faulting page using the selecting physical page (step 42). Additionally, O/S 18 determines the disk sector ID corresponding to the page by consulting the file system maintained by O/S 18 (step 44). O/S 18 calls the BIOS routine for reading the code sequence from disk (which also reads profile data from disk).

BIOS 20 reads the code sequence from disk 16 using the disk sector ID provide by O/S 18 (step 46). Additionally, BIOS 20 determines the location of profile data corresponding to the code sequence (if any) (step 48). BIOS 20 hashes the disk sector ID with the base address of profile/disk pointer list 26 to determine if profile data is stored on disk 16 for the code sequence. If profile data is stored on disk 16, BIOS 20 reads the profile data from disk (using the disk sector ID from profile/disk pointer list 26) and stores the data into profile data area 30 (step 50). Additionally, BIOS 20 updates profile/memory list 30 to point to each profile.

As mentioned above, multiple profiles may be stored for a particular code sequence. In one embodiment, the code linear address of the entry point corresponding to each profile is stored at the beginning of that profile. BIOS 20 reads the first profile from disk 16, and then examines the storage immediately following the first profile. If another code linear address corresponding to the particular code sequence is found, then that profile is read as well. BIOS 20 continues reading profiles until a code linear address outside of the particular code sequence is encountered. Additionally, the code linear address at the beginning of each profile is used by BIOS 20 in the hash function to locate an entry in profile/memory pointer list 30. The located entry is initialized to point to the location within profile data area 28 at which the profile is to be stored.

Figure 3:
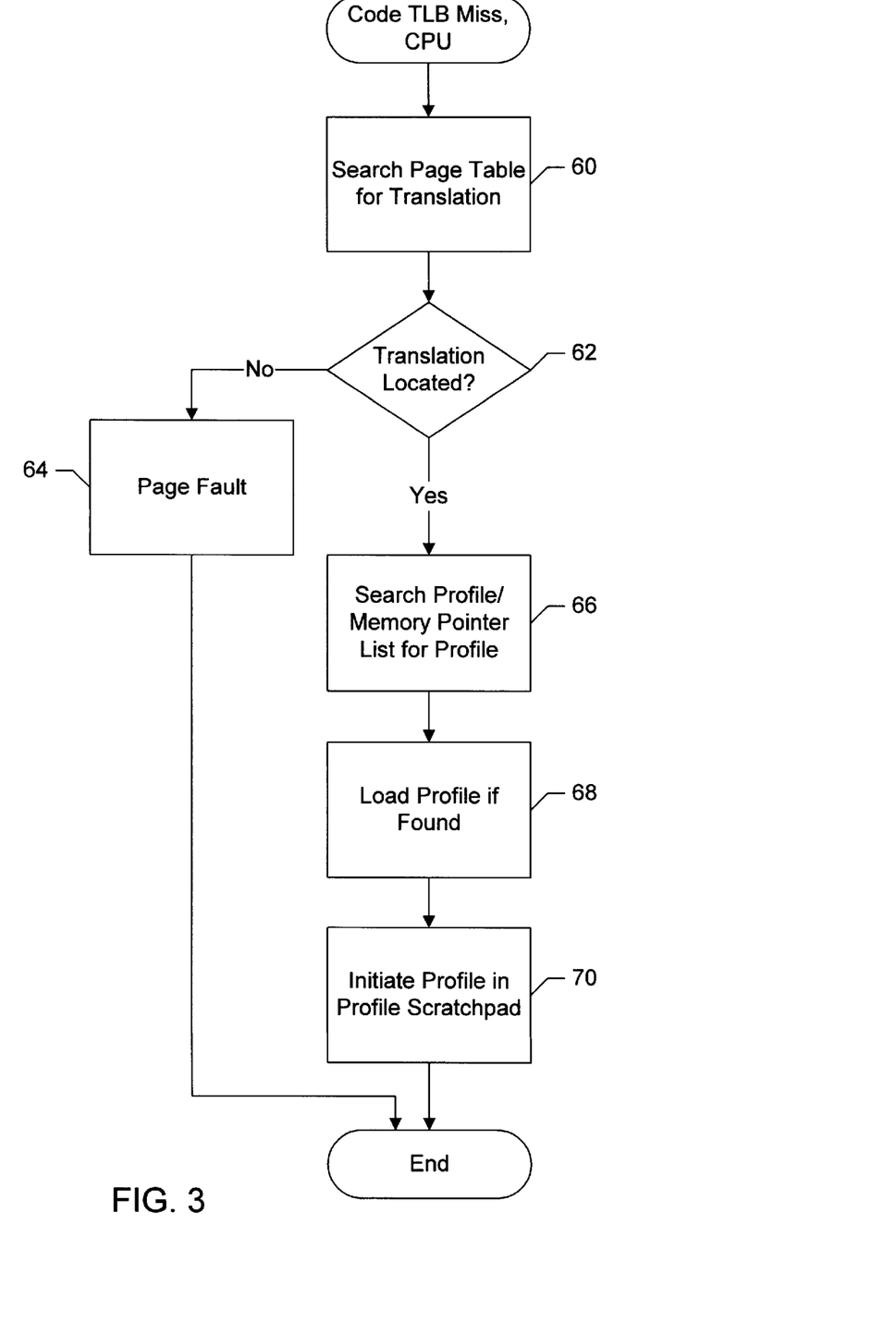
FIG. 3 is a flowchart illustrating operation of one embodiment of the computer system shown in FIG. 1 upon experiencing a translation lookaside buffer (TLB) miss for a code page.

Turning now to FIG. 3, a flowchart illustrating operation of one embodiment of computer system 10 during a TLB miss for a code page is shown. CPU 12 searches the page translation tables (stored in main memory) to locate the translation (step 60). A valid translation may or may not be located in the page translation tables (decision block 62). If a valid translation is not located, CPU 12 generates a page fault exception (step 64). On the other hand, if a valid translation is located, CPU 12 loads the translation into the TLB.

Additionally, upon successful translation of a TLB miss for a code sequence, CPU 12 searches profile/memory pointer list 30 for a profile corresponding to the entry point within the code sequence which is being fetched (step 66). As mentioned above, CPU 12 uses the same hash function involving the profile/memory pointer list base address and the code linear address of the entry point to select an entry within the profile/memory pointer list. If the pointer is valid, then the corresponding profile is read from profile data area 28 (step 68). Additionally, CPU 12 initiates a new profile within profile scratchpad 36 (step 70).

Figure 4:
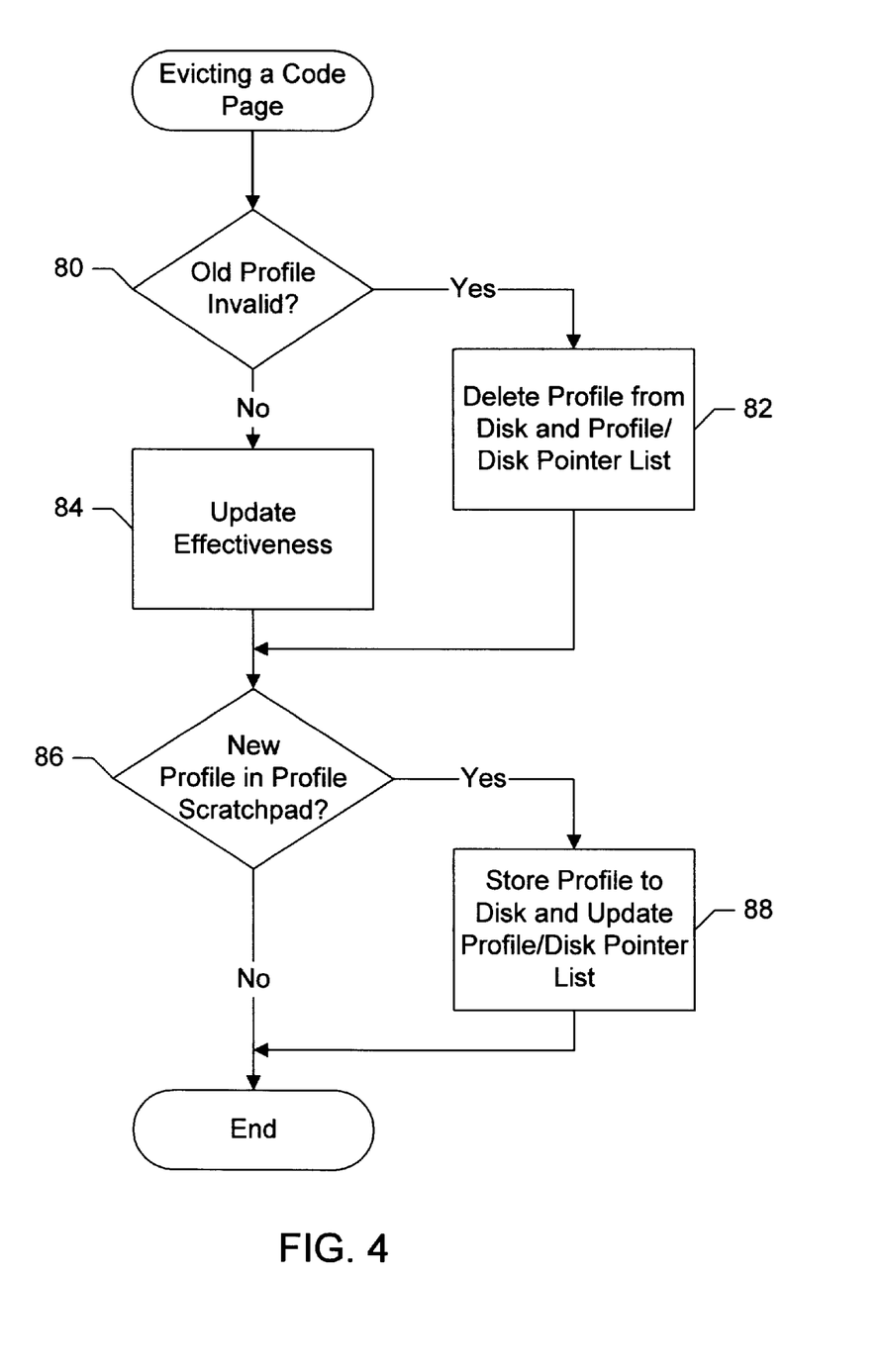
FIG. 4 is a flowchart illustrating operation of one embodiment of the computer system shown in FIG. 1 upon evicting a code page from memory.

Turning next to FIG. 4, a flowchart illustrating operation of one embodiment of computer system 10 when a code page is selected for eviction from main memory is shown. O/S 18 may determine that a code page is to be evicted in order to allocate the physical page to another code page or to a data page upon a page fault for the other code page or data page.

CPU 12, during execution of the code sequence, updates the effectiveness indication corresponding to the profile being used for prefetching. According to one embodiment (as shown below), the effectiveness indication is stored in profile/memory pointer list 30. The effectiveness indication is examined to determine if the profile is no longer valid (i.e. it is marked as ineffective via the effectiveness indication—decision block 80). If the profile is invalid, the profile is deleted from disk 16 and profile/pointer list 26 (step 82). If the profile is not marked as ineffective, then the effectiveness indication stored on disk for the profile is updated (step 84). Each profile corresponding to the code sequence being evicted is checked for ineffectiveness and either deleted or the effectiveness indication is updated.

Additionally, computer system 10 searches profile scratchpad 36 to determine if any new profiles have been generated (decision block 86). If a new profile has been generated and there was no existing profile for the same entry point or the new profile is replacing an existing profile, the profile is stored to disk 16 and profile/disk pointer list 26 is updated (step 88). Each new profile within the code sequence is checked in this manner.

It is noted that the steps shown in FIG. 4 may be performed by either O/S 18 or BIOS 20. In one embodiment, BIOS 20 performs the steps. The routine within BIOS 20 which performs the steps is called by O/S 18 when a code page is evicted. It is further noted that, if BIOS 20 fills the disk sector assigned for storing profiles for the code sequence being evicted, BIOS 20 may request a free disk sector from O/S 18 for storing additional profiles.

While the steps shown in the above flowcharts have been described in a particular order, any order of the steps which produces a similar result may be used. Additionally, while certain steps have been shown serially to enhance understanding, steps may be performed in parallel (e.g. using combinational logic).

Figure 5:
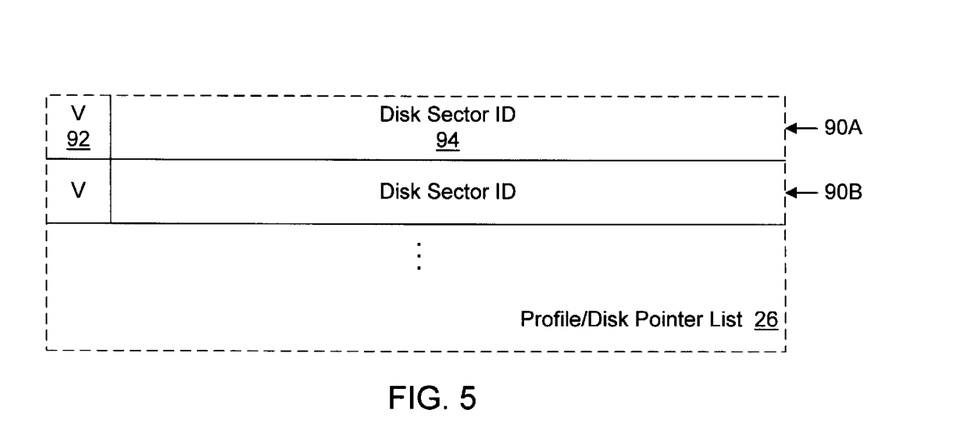
FIG. 5 is a diagram of one embodiment of a profile/disk pointer list structure shown in FIG. 1.

Turning now to FIG. 5, a diagram illustrating one embodiment of profile/disk pointer list 26 is shown. Profile/disk pointer list 26 comprises a plurality of entries such as entries 90A–90B. Each entry 90 includes a valid field (e.g. valid field 92 in entry 90A) and a disk sector ID field (e.g. disk sector ID field 94 in entry 90A). Valid field 92 stores a validity indication for the entry. For example, valid field 92 may store a bit indicative, when set, that the entry is valid and indicative, when clear, that the entry is invalid.

As mentioned above, an entry 90 is selected by hashing the disk sector ID corresponding to a code sequence being read from disk 16 and the base address of profile/disk pointer list 26. If the selected entry is invalid, then there is no profile stored on disk 16 for the code sequence. If the selected entry is valid, then the profile (or profiles) are stored at the disk sector ID indicated by disk sector ID field 94.

Figure 6:
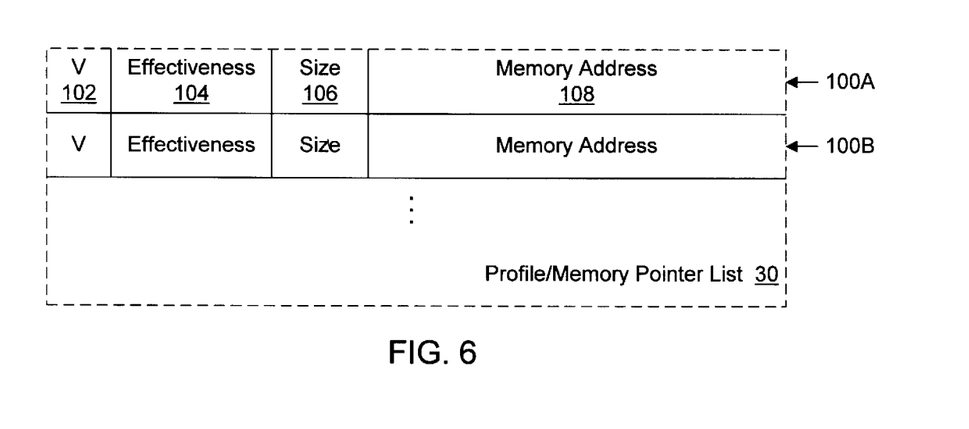
FIG. 6 is a diagram of one embodiment of a profile/memory pointer list structure shown in FIG. 1.

One embodiment of profile/memory pointer list 30 is illustrated in FIG. 6. Profile/memory pointer list 30 comprises a plurality of entries such as entries 100A–100B. Each entry 100 includes a valid field (e.g. valid field 102 in entry 100A), an effectiveness field (e.g. effectiveness field 104 in entry 100A), a size field (e.g. size field 106 in entry 100A), and a memory address field (e.g. memory address field 108 in entry 100A). Valid field 102 indicates the validity of the corresponding entry 100, similar to valid field 92 in FIG. 5.

As mentioned above, a hash of the code linear address of the entry point into a code sequence and the base address of profile/memory pointer list 30 is used to select an entry 100 within profile/memory pointer list 30. If the selected entry 100 is invalid, then no profile is stored in memory for the current entry point into the code sequence. If the selected entry 100 is valid, then memory address field 108 contains the address (within profile data area 28) at which the corresponding profile begins. The data stored in profile data area 28 comprises a list of miss addresses.

Size field 106 stores the size of the corresponding profile. Size field 106 may store, for example, a number of addresses within the profile (and therefore indicates, along with memory address 108, the extent of the profile within profile data area 28).

Effectiveness field 104 stores an effectiveness indication for the profile. The effectiveness indication may use any suitable encoding. For example, the effectiveness indication may be a saturating counter. The largest representable value may indicate completely effective, and each smaller value may indicate slightly less effective until the minimum value (i.e. zero) indicates ineffective. If a profile is found to be effective during a particular execution of the code sequence, the effectiveness indication may be incremented with saturation at the largest possible value. If the profile is found to be ineffective during a particular execution, the effectiveness indication may be decremented. If the effectiveness indication indicates ineffective, the profile may be deleted. The number of ineffective executions (i.e. the number of values representable within the effectiveness indication) may be varied as a matter of design choice.

CPU 12 updates effectiveness indication field 104 with a new effectiveness value each time the profile is used, and the updated effectiveness value may be copied back to disk during eviction of the corresponding code page from memory.

Figure 7:
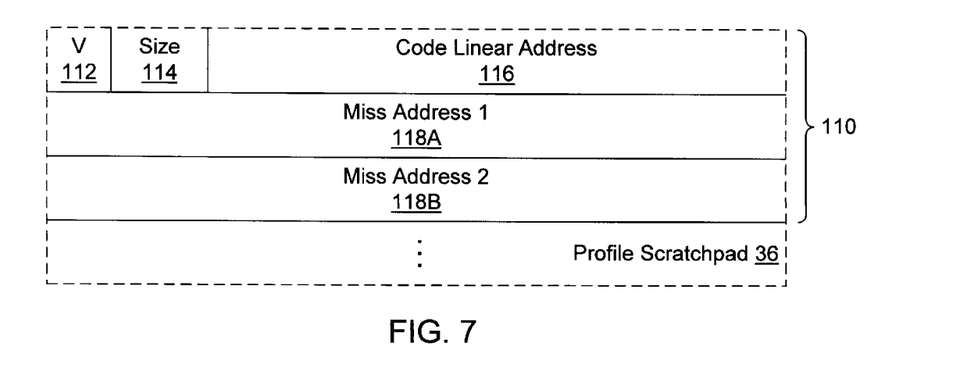
FIG. 7 is a diagram of one embodiment of a profile scratchpad structure shown in FIG. 1.

Turning now to FIG. 7, a diagram illustrating one embodiment of profile scratchpad 36 is shown. One profile entry 110 is illustrated, although additional profile entries may be within profile scratchpad 36. Entry 110 includes a valid field 112, a size field 114, a code linear address field 116, and a plurality of miss address fields including miss address fields 118A–118B. The number of miss address fields 118A–118B is indicated by size field 114. Valid field 112 is similar to valid fields 102 and 92.

When CPU 12 initializes a profile entry 110 in profile scratchpad 112, CPU 12 sets valid field 112 to indicate validity, initializes the size to zero, and stores the code linear address of the entry point into the code sequence being profiled in code linear address field 116. As CPU 12 stores miss addresses into the profile, CPU 12 updates size field 114 to indicate the current size of the profile (e.g. number of miss addresses within the profile). In one embodiment, CPU 12 may buffer a number of miss addresses internally and store the miss addresses to profile scratchpad 36 as a group.

CPU 12 continues to generate profile addresses until either a predetermined maximum size is reached or CPU 12 enters a different code sequence. If another profile is to be generated, CPU 12 initializes another profile entry 110 adjacent to the last miss address field 118 of the previous profile entry.

Figure 8:
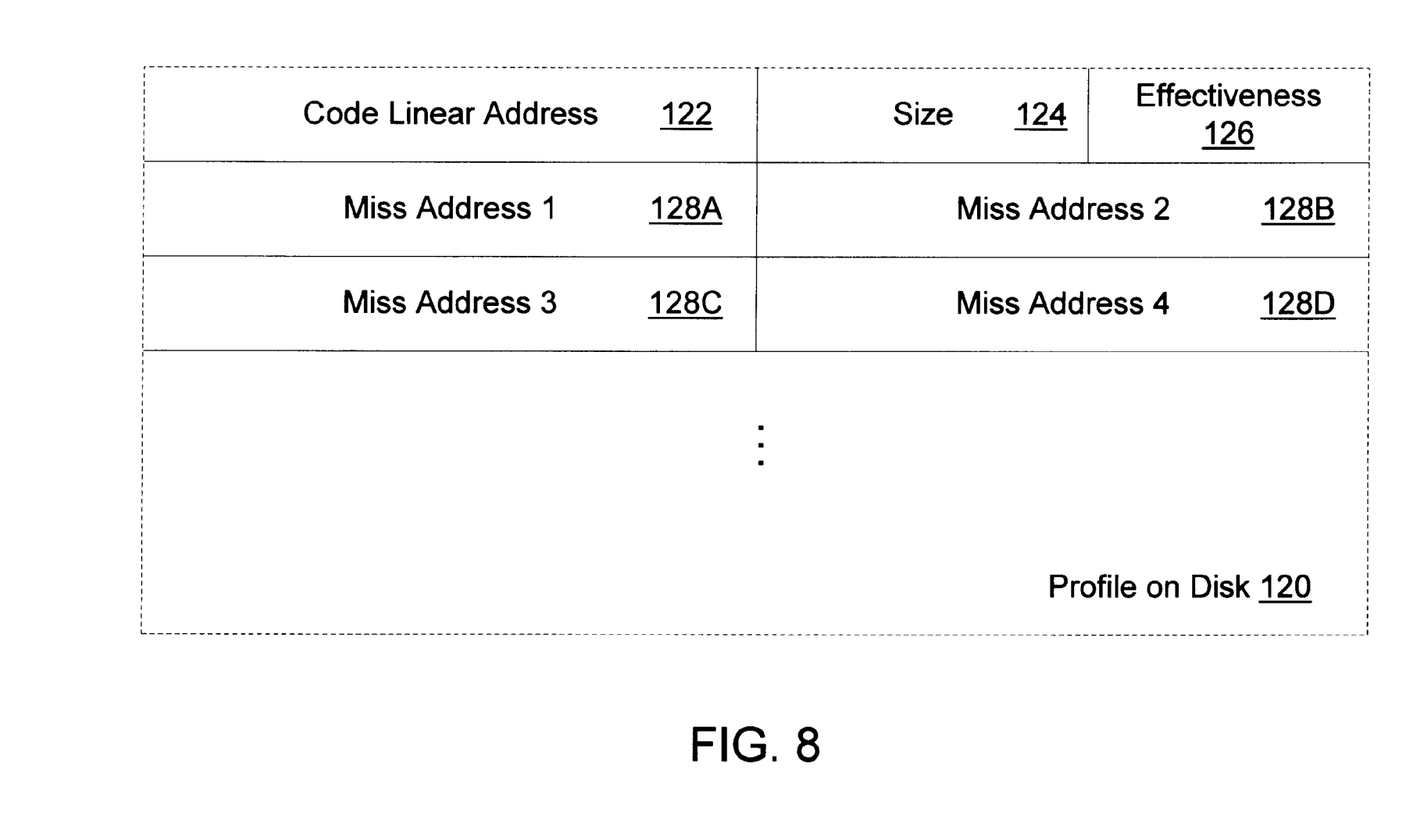
FIG. 8 is a block diagram of one embodiment of a profile as stored on disk in one embodiment of the computer system shown in FIG. 1.

Turning now to FIG. 8, a block diagram of one embodiment of a profile 120 as stored on disk 16 is shown. Profile 120 includes a code linear address field 122, a size field 124, and a set of miss address fields including miss address fields 128A–128D. Code linear address field 122 is originated from code linear address field 116 when CPU 12 generates profile 120. Additionally, code linear address field 122 is used to select an entry 100 within profile/memory pointer list 30 when profile 120 is read from disk 16 and stored into memory 14. Similarly, size field 124 is originated from size field 114 when CPU 12 generates profile 120 and is stored into size field 106 of selected entry 100 when profile 120 is read from disk 16. Effectiveness field 126 is initialized when profile 120 is stored to disk 16, is stored into effectiveness field 104 of selected entry 100 when profile 120 is read from disk 16, and is updated from effectiveness field 104 when the code sequence corresponding to profile 120 is evicted from memory. Finally, miss address fields 128A–128D are initialized from miss address fields 118A–118B when profile 120 is stored to disk 16. Miss address fields 128A–128D are read from disk 16 when profile 120 is read from disk 16 and are stored into profile data area 28 at the address indicated by memory address field 108 in the corresponding entry 100 of profile memory pointer list 30.

Figure 9:
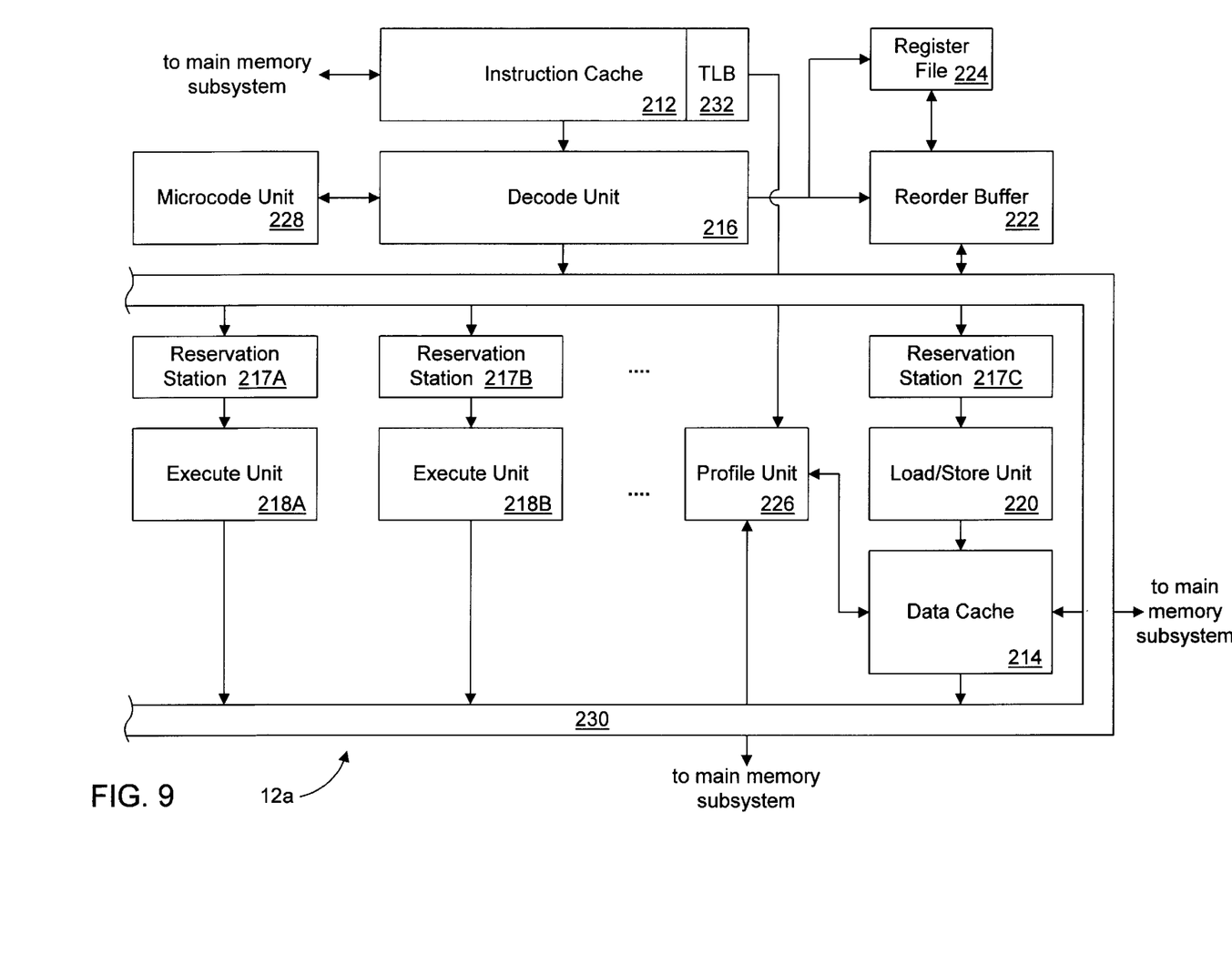
FIG. 9 is a block diagram of one embodiment of a microprocessor shown in FIG. 1.

Turning now to FIG. 9, a block diagram of one embodiment of CPU 12 (microprocessor 12a) is shown. Microprocessor 12a includes an instruction cache 212, a data cache 214, a decode unit 216, a plurality of reservation stations including reservation stations 217A, 217B, and 217C, a plurality of execute units including execute units 218A and 218B, a load/store unit 220, a reorder buffer 222, a register file 224, a profile unit 226, and a microcode unit 228. Elements referred to herein with a particular reference number followed by a capital letter will be collectively referred to by the reference number alone. For example, the plurality of execute units will be collectively referred to herein as execute units 218. Execute units 218 may include more execute units than execute units 218A and 218B shown in FIG. 9. Additionally, an embodiment of microprocessor 12a may include one execute unit 218.

As shown in FIG. 9, instruction cache 212 is coupled to a main memory subsystem (not shown) and to a decode unit 216, which is further coupled to reservation stations 217, reorder buffer 222, register file 224, and microcode unit 228. Instruction cache 212 includes a translation lookaside buffer (TLB) 232 for translating linear fetch addresses to physical fetch addresses. TLB 232 is coupled to profile unit 226. Reorder buffer 222, execute units 218, and data cache 214 are each coupled to a result bus 230 for forwarding of execution results. Furthermore, each reservation station 217A and 217B is coupled to a respective execute unit 218A and 218B, while reservation station 217C is coupled to load/store unit 220. Each reservation station 217 is coupled to receive operand information from reorder buffer 222. Load/store unit 220 is coupled to data cache 214, which is further coupled to the main memory subsystem. Finally, profile unit 226 to data cache 214 and to the main memory subsystem.

Generally speaking, profile unit 226 is configured to generate profiles for code sequences executed by microprocessor 12a and is configured to use profiles to prefetch data when executing a code sequence. Profile unit 226 receives data cache misses from data cache 214. If the data cache miss corresponds to data that has been prefetched in response to a profile, profile unit 226 provides the data to data cache 214. Additionally, profile unit 226 is configured to gauge the effectiveness of a profile being used by comparing the data cache misses to the addresses in the profile. Profile unit 226 may thereby update the effectiveness indication of the profile as stored in memory 14.

Profile unit 226 receives TLB miss indications from TLB 232. When a TLB miss indication is received, profile unit 226 searches profile/memory pointer list 30 to determine if a profile exists for the code sequence indicated by the code linear address which is missing in TLB 232. Additionally, profile unit 226 may initiate a new profile for the code sequence in profile scratchpad 36.

Instruction cache 212 is a high speed cache memory for storing instructions. It is noted that instruction cache 212 may be configured into a set-associative or direct mapped configuration. Instruction cache 212 may additionally include a branch prediction mechanism for predicting branch instructions as either taken or not taken. Instructions are fetched from instruction cache 212 and conveyed to decode unit 216 for decode and dispatch to a reservation station 217. TLB 232 provides translations for the fetch addresses being presented to instruction cache 212. Generally, a TLB is a cache for translations between linear addresses and corresponding physical addresses. When a TLB miss is detected, TLB 232 may perform a TLB reload (in which TLB 232 searches the page translation tables for a valid translation) and generate a page fault exception if a valid translation is not located.

Decode unit 216 decodes each instruction fetched from instruction cache 212. Decode unit 216 dispatches the instruction to one or more of reservation stations 217 depending upon the type of instruction detected. More particularly, decode unit 216 produces a decoded instruction in response to each instruction fetched from instruction cache 212. The decoded instruction comprises control signals to be used by execute units 218 and/or load/store unit 220 to execute the instruction. For example, if a given instruction includes a memory operand, decode unit 216 may signal load/store unit 220 to perform a load/store (i.e. read/write) memory operation in response to the given instruction.

Decode unit 216 also detects the register operands used by the instruction and requests these operands from reorder buffer 222 and register file 224. In one embodiment, execute units 218 are symmetrical execution units. Symmetrical execution units are each configured to execute a particular subset of the instruction set employed by microprocessor 12a. The subsets of the instruction set executed by each of the symmetrical execution units are the same. In another embodiment, execute units 218 are asymmetrical execution units configured to execute dissimilar instruction subsets. For example, execute units 218 may include a branch execute unit for executing branch instructions, one or more arithmetic/logic units for executing arithmetic and logical instructions, and one or more floating point units for executing floating point instructions. Decode unit 216 dispatches an instruction to a reservation station 217 which is coupled to an execute unit 218 or load/store unit 220 which is configured to execute that instruction.

Microcode unit 228 is included for handling instructions for which the architecturally defined operation is more complex than the hardware employed within execute units 218 and load/store unit 220 may handle. Microcode unit 228 parses the complex instruction into multiple instructions which execute units 218 and load/store unit 220 are capable of executing. Additionally, microcode unit 228 may perform functions employed by microprocessor 12a. For example, microcode unit 228 may perform instructions which represent a context switch. Generally speaking, the "context" of a program comprises the state needed to correctly run that program. Register values created by the program are included in the context, as are the values stored in any memory locations used by the program. Microcode unit 228 causes the context stored within microprocessor 12a to be saved to memory at a predefined memory location (according to the microprocessor architecture employed by microprocessor 12a) and restores the context of the program being initiated. Context switches may occur in response to an interrupt being signalled to microprocessor 12a, for example.

Load/store unit 220 provides an interface between execute units 218 and data cache 214. Load and store memory operations are performed by load/store unit 220 to data cache 214. Additionally, memory dependencies between load and store memory operations are detected and handled by load/store unit 220. Generally speaking, a "memory operation" is performed to transfer data between the main memory and microprocessor 12a. A load memory operation specifies the transfer of data from one or more memory locations within the main memory to microprocessor 12a. On the other hand, a store memory operation specifies the transfer of data from microprocessor 12a to one or more memory locations within the main memory. The memory location or locations accessed by a given memory operation are identified within the main memory by an address corresponding to the given memory operation.

Reservation stations 217 are configured to store instructions whose operands have not yet been provided. An instruction is selected from those stored in a reservation station 217A–217C for execution if: (1) the operands of the instruction have been provided, and (2) the instructions within the reservation station 217A–217C which are prior to the instruction being selected in program order have not yet received operands. It is noted that a centralized reservation station may be included instead of separate reservations stations. The centralized reservation station is coupled between decode unit 216, execute units 218, and load/store unit 220. Such an embodiment may perform the dispatch function within the centralized reservation station.

Microprocessor 12a supports out of order execution, and employs reorder buffer 222 for storing execution results of speculatively executed instructions and storing these results into register file 224 in program order, for performing dependency checking and register renaming, and for providing for mispredicted branch and exception recovery. When an instruction is decoded by decode unit 216, requests for register operands are conveyed to reorder buffer 222 and register file 224. In response to the register operand requests, one of three values is transferred to the reservation station 217A–217C which receives the instruction: (1) the value stored in reorder buffer 222, if the value has been speculatively generated; (2) a tag identifying a location within reorder buffer 222 which will store the result, if the value has not been speculatively generated; or (3) the value stored in the register within register file 224, if no instructions within reorder buffer 222 modify the register. Additionally, a storage location within reorder buffer 222 is allocated for storing the results of the instruction being decoded by decode unit 216. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 218 or load/store unit 220 execute an instruction, the tag assigned to the instruction by reorder buffer 222 is conveyed upon result bus 230 along with the result of the instruction. Reorder buffer 222 stores the result in the indicated storage location. Additionally, reservation stations 217 compare the tags conveyed upon result bus 230 with tags of operands for instructions stored therein. If a match occurs, the unit captures the result from result bus 230 and stores it with the corresponding instruction. In this manner, an instruction may receive the operands it is intended to operate upon. Capturing results from result bus 230 for use by instructions is referred to as "result forwarding".

Instruction results are stored into register file 224 by reorder buffer 222 in program order. Storing the results of an instruction and deleting the instruction from reorder buffer 222 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 222 discards the instructions subsequent to the mispredicted branch instructions. Instructions thus discarded are also flushed from reservation stations 217, execute units 218, load/store unit 220, and decode unit 216.

Register file 224 includes storage locations for each register defined by the microprocessor architecture employed by microprocessor 12a. For example, microprocessor 12a may employ the x86 microprocessor architecture. For such an embodiment, register file 224 includes locations for storing the EAX, EBX, ECX, EDX, ESI, EDI, ESP, and EBP register values.

Data cache 214 is a high speed cache memory configured to store data to be operated upon by microprocessor 12a. It is noted that data cache 214 may be configured into a set-associative or direct-mapped configuration. Data cache 214 allocates and deallocates storage for data in cache lines. A cache line is a block of contiguous bytes. The byte within the cache line which has the lowest numerical address is stored at an address which is aligned to a cache line boundary.

The main memory subsystem effects communication between microprocessor 12a and devices coupled thereto. For example, instruction fetches which miss instruction cache 212 may be transferred from a main memory by the main memory subsystem. Similarly, data requests performed by load/store unit 220 which miss data cache 214 may be transferred from main memory by the main memory subsystem. Additionally, data cache 214 may discard a cache line of data which has been modified by microprocessor 12a. The main memory subsystem transfers the modified line to the main memory. Still further, the main memory subsystem receives requests to load and store profile information from profile unit 226. In order to minimize interruption of transfers to instruction cache 212 and data cache 214, the main memory subsystem may prioritize data transfers requested by profile unit 226 below data transfers requested by instruction cache 212 and data cache 214.

It is noted that decode unit 216 may be configured to dispatch an instruction to more than one execution unit. For example, in embodiments of microprocessor 12a which employ the x86 microprocessor architecture, certain instructions may operate upon memory operands. Executing such an instruction involves transferring the memory operand from data cache 214, executing the instruction, and transferring the result to memory (if the destination operand is a memory location) or data cache 214. Load/store unit 220 performs the memory operations, and an execute unit 218 performs the execution of the instruction.

Figure 10:
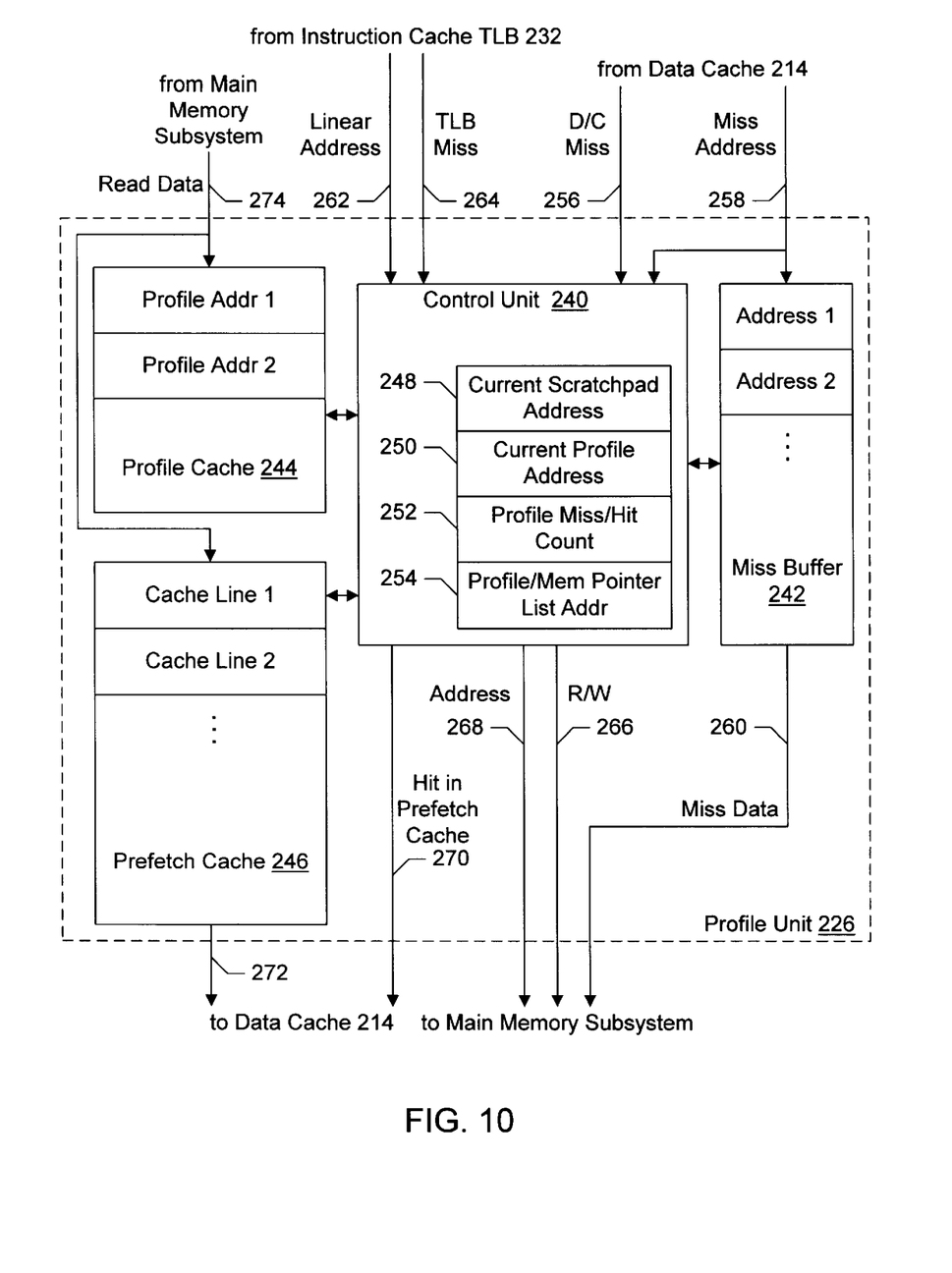
FIG. 10 is a block diagram of one embodiment of a profile unit shown in FIG. 9.

Turning now to FIG. 10, a block diagram of one embodiment of profile unit 226 is shown. Other embodiments of profile unit 226 are contemplated. As shown in FIG. 10, profile unit 226 includes a control unit 240, a miss buffer 242, a profile cache 244, and a prefetch cache 246. Control unit 240 includes a current scratchpad address register 248, a current profile address register 250, a profile miss/hit count register 252, and a profile/memory pointer list address register 254. Control unit 240 is coupled to miss buffer 242, profile cache 244, and prefetch cache 246. Additionally, control unit 240 is coupled to a D/C miss line 256 and a miss address bus 258 from data cache 214. Miss address bus 258 is also coupled to miss buffer 242, which is further coupled to a miss data bus 260 to the main memory subsystem. Control unit 240 is still further coupled to a linear address bus 262 and a TLB miss line 264 from TLB 232 and to a read/write (R/W) line 266 and an address bus 268 to the main memory subsystem. Additionally, control unit 240 is coupled to a hit in prefetch cache line 270 to data cache 214. Prefetch cache 246 is coupled to a data bus 272 to data cache 214. A read data bus 274 from the main memory subsystem is coupled to profile cache 244 and prefetch cache 246.

Control unit 240 is configured to control miss buffer 242, profile cache 244, and prefetch cache 246 in order to generate profiles and to use profiles for prefetching. Using the addresses in the profile, control unit 240 prefetches cache lines into prefetch cache 246. Prefetch cache 246 is used to avoid displacing cache lines in data cache 214, in case the prefetched cache lines are not used. When a profile is initially accessed, control unit 240 prefetches cache lines corresponding to the foremost addresses within the profile into prefetch cache 246. Prefetch cache 246 stores the cache line of data as well as the corresponding linear address. Additionally, state information regarding the cache lines may be added if desired for prefetching/profiling purposes. It is noted that, in order to fetch cache lines from memory, control unit 240 may access a TLB similar to TLB 232 to translate the linear addresses. Control unit 240 may maintain a TLB itself, or may access a TLB shared with data cache 214. Alternatively, the main memory subsystem may translate addresses for control unit 240.

As cache lines are consumed into data cache 214, additional addresses may be prefetched. Additionally, profile cache 244 stores the profile addresses which are subsequent (within the profile) to the addresses corresponding to the cache lines stored in prefetch cache 246. Control unit 240 therefore enjoys visibility to a larger portion of the profile than would be possible without profile cache 244. For example, if a data cache miss is compared to addresses in profile cache 244 and is found to match one of those addresses, the contents of prefetch cache 246 may be discarded and prefetching initiated with addresses in the profile subsequent to the matching address. After filling prefetch cache 246, additional miss addresses from the profile may be fetched into profile cache 244.

Data cache 214 signals that a data cache miss has occurred using D/C miss line 256. The miss address is concurrently provided upon miss address bus 258. As mentioned above, the miss address is a linear address (since physical addresses may change from execution to execution). If control unit 240 is generating a profile for the current code sequence, control unit 240 directs miss buffer 242 to store the miss address. Additionally, control unit 240 compares the miss address to the addresses of the cache lines stored in prefetch cache 246 and to the addresses stored in profile cache 244 if a profile for the current code sequence is in use. If a hit is detected in prefetch cache 246, the corresponding cache line is provided, via data bus 272, to data cache 214. Additionally, control unit 240 signals data cache 214 that a hit has occurred via hit in prefetch cache line 270. Data cache 214 is thereby informed to accept the cache line from prefetch cache 246. Prefetch cache 246 discards the cache line, and an additional cache line from the profile may be fetched.

When miss buffer 242 becomes full, control unit 240 transfers the address within profile scratchpad 36 at which the miss addresses should be stored to the main memory subsystem on address bus 268 and indicates a write via write line 266. Additionally, the contents of miss buffer 242 are transferred to the main memory subsystem via miss data bus 260. Miss buffer 242 may be sized, for example, to store a number of miss addresses which occupy the number of bytes which can be transferred from microprocessor 12a in a single burst. A cache line of miss addresses may be the size of a burst, for example. After transferring the contents of miss buffer 242 to memory, control unit 240 updates the size field of the profile within profile scratchpad 36. Control unit 240 may retain the size in order to calculate (with the current scratchpad address from register 248) the position of the size field and the new size to be stored therein.

Control unit 240 maintains the current address to be updated with miss addresses in profile scratchpad address register 248. When control unit 240 stores the contents of miss buffer 242 to memory, control unit 240 uses the contents of profile scratchpad address register 248 to provide the address on address bus 268. Control unit 240 then updates the address in profile scratchpad address register 248 to indicate the byte subsequent to the last byte updated by storing miss buffer 242.

Miss buffer 242 may also be stored out to memory when a TLB miss is indicated via TLB miss line 264. When a TLB miss is indicated, control unit 240 initializes a new profile for the code sequence being fetched from the missing page. Therefore, control unit 240 stores remaining miss addresses within miss buffer 242 to profile scratchpad 36, and then initializes a new profile within profile scratchpad 36 as well (i.e. stores the linear address provided by TLB 232 and an initial size to profile scratchpad 36). It is noted that control unit 240 may be configured to terminate a profile after recording a predetermined maximum number of miss addresses. Additionally, control unit 240 may be configured to terminate a profile upon experiencing a TLB miss for a different code sequence.

Control unit 240 also searches for a profile corresponding to the TLB miss address provided by TLB 232. Profile/memory pointer list address register 254 stores the base address of profile/memory pointer list 30. Control unit 240 hashes the TLB miss address with the base address and reads the resulting address to determine .if a profile is stored in profile data area 28. If a profile is located, the address of the profile (from memory address field 108 of the pointer to the profile) is stored into current profile address register 250. Subsequently, control unit 240 updates the address stored in register 250 based upon the data and addresses prefetched into prefetch cache 246 and profile cache 244.

Control unit 240 is further configured to determine the effectiveness of a profile being used. Control unit 240 notes the number of cache misses predicted by the profile versus the number of cache misses not predicted by the profile in profile miss/hit count register 252. Upon reaching the end of the profile or beginning execution of a different code sequence, control unit 240 determines if the value in profile miss/hit count register 252 exceeds a predetermined threshold. If the threshold is exceeded, control unit 240 decrements the effectiveness of the profile and updates profile/memory pointer list 30. If the threshold is not exceeded, control unit 240 increments the effectiveness of the profile and updates profile/memory pointer list 30. Alternatively, two thresholds may be selected. One threshold, if exceeded, results in the effectiveness being decremented. A second threshold, if not exceeded, results in the effectiveness being incremented. Otherwise, the effectiveness is left unmodified.

It is noted that, in other embodiments, prefetch cache 246 may be eliminated and cache lines may be directly prefetched into data cache 214. Additionally, profile cache 244 may be eliminated in other embodiments. Still further, miss buffer 242 may be eliminated and miss addresses may be stored to memory as they occur. Alternatively, a write gathering buffer may be employed within the main memory subsystem to gather profile addresses instead of employing miss buffer 242 or storing miss addresses to memory as they occur.

In accordance with the above disclosure, a prefetch method and apparatus using profiles from previous executions has been described. Because a profile of miss addresses is recorded, access patterns which are arbitrarily complex may be correctly prefetched using the profile of a previous execution. Performance may be increased through an increased correctness of the prefetch.

Numerous variations and modifications will become apparent to those skilled in the art once the above disclosure is fully appreciated. It is intended that the following claims be interpreted to embrace all such variations and modifications.

What is claimed is:

1. A method for prefetching data accessed by a code sequence in a computer system, comprising:

generating a profile comprising addresses of up to N cache misses experienced during a first execution of said code sequence; and prefetching said addresses within said profile during a second execution of said code sequence.

2. The method as recited in claim 1 further comprising:

terminating said first execution of said code sequence; and subsequently initiating said second execution of said code sequence.

3. The method as recited in claim 1 further comprising storing said profile to a memory.

4. The method as recited in claim 1 wherein said prefetching comprises loading M cache lines specified by M addresses within said profile into a prefetch cache within a microprocessor within said computer system.

5. The method as recited in claim 4 wherein said prefetching further comprises loading O addresses from said profile into a profile cache, said O addresses being exclusive of said M addresses.

6. The method as recited in claim 1 wherein said prefetching is initiated upon detection of a translation lookaside buffer (TLB) miss for a page containing said code sequence.

7. A computer system comprising:

a disk storing a code sequence and a corresponding profile comprising addresses of up to N cache misses experienced during a first execution of said code sequence; and a central processing unit (CPU) coupled to said disk, wherein said CPU is configured to perform a second execution of said code sequence, and wherein said CPU is configured to prefetch said addresses in said profile during said second execution.

8. The computer system as recited in claim 7 further comprising a memory coupled to said CPU, wherein said CPU is configured to read said profile from said disk into said memory, and wherein said CPU is configured to read said profile from said memory into said CPU.

9. The computer system as recited in claim 7 wherein said CPU comprises a prefetch cache, and wherein said CPU is further configured to prefetch data corresponding to a first set of addresses within said profile into said prefetch cache.

10. The computer system as recited in claim 9 wherein said CPU further comprises a profile cache, and wherein said CPU is further configured to prefetch a second set of addresses, exclusive of said first set of addresses, from said profile into said profile cache.

11. The computer system as recited in claim 7 wherein said memory is further configured to store a profile/memory pointer list which stores a pointer to a memory location storing said profile, and wherein said CPU is configured to access said profile/memory pointer list to locate said profile in said memory.

12. The computer system as recited in claim 7 wherein said CPU is further configured to generate said profile during said first execution, and wherein said CPU is configured to store said profile to said memory.

13. A computer readable medium configured to store a set of instructions which:

loads a code sequence into a memory of a computer system; and loads a profile comprising addresses of up to N cache misses experienced during a first execution of said code sequence into said memory.

14. The computer readable medium as recited in claim 13 wherein said set of instructions further:

evicts said code sequence from said memory; and checks an effectiveness indication in said profile.

15. The computer readable medium as recited in claim 14 wherein said set of instructions further deletes said profile if said effectiveness indication indicates ineffective.

16. The computer readable medium as recited in claim 15 wherein said set of instructions further replaces said profile with a second profile generated during a second execution of said code sequence.

17. The computer readable medium as recited in claim 14 wherein said set of instructions further updates said profile if said effectiveness indication indicates effective.

18. The computer readable medium as recited in claim 13 wherein said set of instructions loads said profile into said memory by:

determining a disk sector ID corresponding to said code sequence; and accessing a profile/disk pointer list stored in said memory using said disk sector ID to determine a location of said profile on a disk.

19. The computer readable medium as recited in claim 18 wherein said set of instructions accesses said profile/disk pointer list by hashing said disk sector ID with a base address of said profile/disk pointer list.

\* \* \* \* \*